United States Patent [19]

Cole, Jr. et al.

[11] 3,774,365

[45] Nov. 27, 1973

[54] PANEL AND CORE

[75] Inventors: Theodore P. Cole, Jr., Monroeville Borough; John W. Turnage, Franklin Twp., Westmoreland County, both of Pa.

[73] Assignee: United States Steel Corporation, Pittsburgh, Pa.

[22] Filed: July 24, 1972

[21] Appl. No.: 274,554

Related U.S. Application Data

[63] Continuation of Ser. No. 35,864, May 8, 1970, abandoned.

[52] U.S. Cl. ................... 52/615, 161/68, 156/197
[51] Int. Cl. .................... E04b 2/58, E04c 2/32
[58] Field of Search ................ 52/615, 619, 625; 161/68

[56] References Cited
UNITED STATES PATENTS

| | | | |
|---|---|---|---|
| 2,959,257 | 11/1960 | Campbell | 52/615 |
| 2,983,038 | 5/1961 | Johnson | 52/615 |
| 3,137,604 | 6/1964 | Bosch | 161/68 |

FOREIGN PATENTS OR APPLICATIONS

| | | | |
|---|---|---|---|
| 665,850 | 1/1952 | Great Britain | 52/615 |
| 603,731 | 8/1960 | Canada | 52/615 |

*Primary Examiner*—Frank L. Abbott
*Assistant Examiner*—James L. Ridgill, Jr.
*Attorney*—Robert J. Leek, Jr.

[57] ABSTRACT

A core member for a high-strength, light-weight panel for use as a temporary landing field mat, decking for trucks, tractors, rail cars, or the like is disclosed. The panel has a cover member secured to one side of the core member. The core member has a first core strip. The first core strip has a first bonding section provided with a first bonding flange projecting from one end of the first bonding section. A first bonding portion is provided on one side of the first bonding section. The first core strip also has one end of a first connecting section projecting from the terminal portion of the first bonding portion at a bend angle so that the other end of the first connecting section is provided with a first connecting flange projecting from one end of the first connecting section. A first connecting edge portion is provided on the side of the first connecting section adjacent the first bonding portion. A second core strip is disposed adjacent the first bonding portion of the first core strip. The second core strip has a second connecting section provided with a second connecting flange projecting from one end of the second connecting section. A second connecting edge portion is provided on one end of the second connecting section adjacent the first bonding portion of the first core strip. The second connecting section extends from the first bonding portion of the first core strip substantially parallel to the first connecting section. The second core strip also has a second bonding section extending from the second connecting edge portion substantially as a continuation of the first bonding section of the first core strip. The second bonding section is provided with a second bonding flange projecting from one end of the second bonding section. A second bonding portion is provided adjacent the second connecting edge portion in sealing engagement with the first bonding portion of the first bonding section. Connection means are associated with the second bonding portion of the second bonding section and the first bonding portion of the first bonding section to secure them together thereby forming adjacent half portions of two adjacent substantially parallelepiped cells of the core member.

19 Claims, 31 Drawing Figures

Patented Nov. 27, 1973

INVENTORS.
THEODORE P. COLE, JR. &
JOHN W. TURNAGE
By
[signature]
Attorney

Patented Nov. 27, 1973

INVENTORS.
THEODORE P. COLE, JR. &
JOHN W. TURNAGE
By
Attorney

INVENTORS.
THEODORE P. COLE, JR. &
JOHN W. TURNAGE

By

Attorney

INVENTORS.
THEODORE P. COLE, JR. &
JOHN W. TURNAGE
By

Attorney

Patented Nov. 27, 1973

INVENTORS.
THEODORE P. COLE, JR. &
JOHN W. TURNAGE

By
Attorney

Patented Nov. 27, 1973  3,774,365

INVENTORS.
THEODORE P. COLE, JR. &
JOHN W. TURNAGE
By
Attorney

Patented Nov. 27, 1973

INVENTORS.
THEODORE P. COLE, JR. &
JOHN W. TURNAGE

By

Attorney

Patented Nov. 27, 1973

INVENTORS.
THEODORE P. COLE, JR. &
JOHN W. TURNAGE

By

Attorney

PANEL AND CORE

This application is a continuation of U.S. Pat. Application Ser. No. 35,864, now abandoned filed May 8, 1970 by applicants and assigned to the same assignee as the present invention.

BACKGROUND OF THE INVENTION

Currently, government departments and agencies require high-strength, light-weight panels for use, for example, as temporary landing field mats, or as decking for trucks. Each panel has two external metallic sheets disposed about an internal cellular sheet metal core member. It is essential that these panel assemblies possess a high strength-to-weight ratio which ratio can be achieved by the use of a light gauge sheet metal for the cellular sheet metallic core and the use of a high strength thermosetting adhesive to fasten the external or cover sheet members to the core member. Currently, there are two common types of core members; namely, the hexagonal cell type core member having continuous bent sheet metal strips which form the hexagonal cell and the slitted strip type core member having straight slitted sheet metal strips into which the slits of the longitudinal members of the core strip and the slits of the lateral members of the core strip intermesh to form a square cell.

A disadvantage of the hexagonal type cell member is that the bending members of the assembled core are not straight, thereby permitting bending of the core member without failure of the core material, with attendant reductions in the core strength. Thus, compression may buckle an external or cover sheet member without causing failure of the core member or gross failure of the adhesive bond between the core member and the cover sheet members.

The slitted strip type core member is undesirable because the slits of the bending members and the adhesively bonded butt joints between the metal strips reduce the core member strength. Further, this strip type core member requires a complex apparatus for the application of the adhesive to the panel assembly.

Conventional reinforced panel assemblies are shown in the following U.S. Patents:

| U.S. Pat. No. | Inventor | Issued |
|---|---|---|
| 2,053,135 | Dalton | 9/1/36 |
| 2,744,624 | Hoogstoel et al. | 5/8/56 |
| 3,033,708 | McKee | 5/8/62 |
| 3,137,604 | Bosch | 6/16/64 |

OBJECTS OF THE INVENTION

It is the general object of this invention to avoid and overcome the foregoing and other difficulties of and objections to prior art practices by the provision of an improved panel assembly which:

a. provides a high strength and a light weight;

b. provides a high strength-to-weight ratio;

c. has continuous formed strips of metal or other material for the core member to form rhombic cells which are adapted to be adhesively bonded at a lapped joint of considerable adhesive bonding area;

d. provides a substantially square high-strength core cell;

e. provides a lapped joint between core strips, which lapped joint has substantial contact or adhesive area;

f. is relatively simple to assemble;

g. permits the use of a multi-nozzle adhesive apparatus on the flanges of the core strips;

h. is readily aligned in a jig to effect the assembly of a core member;

i. utilizes as a core material any material of sufficient rigidity such as metal, paper, impregnated paper, laminated materials, plastics such as nylon, teflon, polyvinyl chloride, polyvinyl acetate, polyolefin, or the like;

j. can be assembled readily as by a thermosetting adhesive, thermoplastic adhesive, welding, soldering, brazing, crimping, or the like;

k. is formed of a core member and external or cover sheet members which can be readily varied in dimension to obtain any desired panel assembly strength;

l. provides substantially straight core strip sections thereby preventing bending of the core member without failure of the core material and further preventing reduction in the assembly strength;

m. prevents compressive buckling of an external or cover sheet member without causing failure of the core member or the adhesive bond;

n. eliminates the complex adhesive applicator equipment required for the application of an adhesive to some conventional panels; and o. provides a substantially straight core element along a major axis of strength and a minor axis of strength.

BRIEF SUMMARY OF THE INVENTION

The aforesaid objects of this invention, and other objects which will become apparent as the description proceeds, are achieved by providing a core member for a high-strength, light-weight panel having a first core strip. The first core strip has a first bonding section provided with a first bonding flange projecting from one end of the first bonding section. A first bonding portion is disposed on one side of the first bonding section. The first core strip also has one end of a first connecting section projecting from the terminal portion of the first bonding portion at a bend angle so that the other end of the first connecting section lies adjacent a plane disposed at an axis angle with the inner end of the first bonding section. The first connecting section is provided with a first connecting flange projecting from one end of the first connecting section. A second core strip is disposed adjacent the first bonding portion of the first core strip. The second core strip has a second connecting section provided with a second connecting flange projecting from one end of the second connecting section. The second connecting section extends from the first bonding portion of the first core strip substantially parallel to the first connecting section. The second core strip also has a second bonding section extending from the second connecting edge substantially as a continuation of the first bonding section of the first core strip. The second bonding section is provided with a second bonding flange projecting from one end of the second bonding section. A second bonding portion is disposed adjacent the second connecting edge portion in sealing engagement with the first bonding portion of the first connecting section. Connection means are associated with the second bonding portion of the second bonding section and the first bonding portion of the first bonding section to secure them together thereby forming adjacent half portions of two adjacent substantially parallelepiped cells of the core member.

BRIEF DESCRIPTION OF THE SEVERAL VIEWS OF THE DRAWINGS

For a better understanding of this invention, reference should be had to the accompanying drawings wherein like numerals of reference indicate similar parts throughout the several views and wherein:

FIG. 8 is an enlarged fragmentary plan view of an alternative embodiment of the first long section wherein the first long flange is provided with a plurality of dimples or holes, such as round holes, slots, square or rhombic holes, cross holes, mesh holes, zig-zag holes, corrugated holes, and the like;

FIG. 9 is a view similar to one taken along the lines 9—9 of FIg. 8 in the direction of the arrows and showing the first long flange provided with a plurality of protuberances, such as round dimples, pointed dimples, rectangular-shaped dimples, hollow dimples, frusto-conical hollow dimples, frusto-spherical dimples, divergent prong-type protuberances, or the like.

Although the principles of this invention are particularly adapted to high-strength, light-weight panels for use as a temporary landing field mat or decking for trucks, trailers, rail cars, or the like, this invention is particularly adapted for use in conjunction with such a panel for use as a temporary landing field mat and hence it has been so illustrated and will be so described.

DETAILED DESCRIPTION

Figure 1:
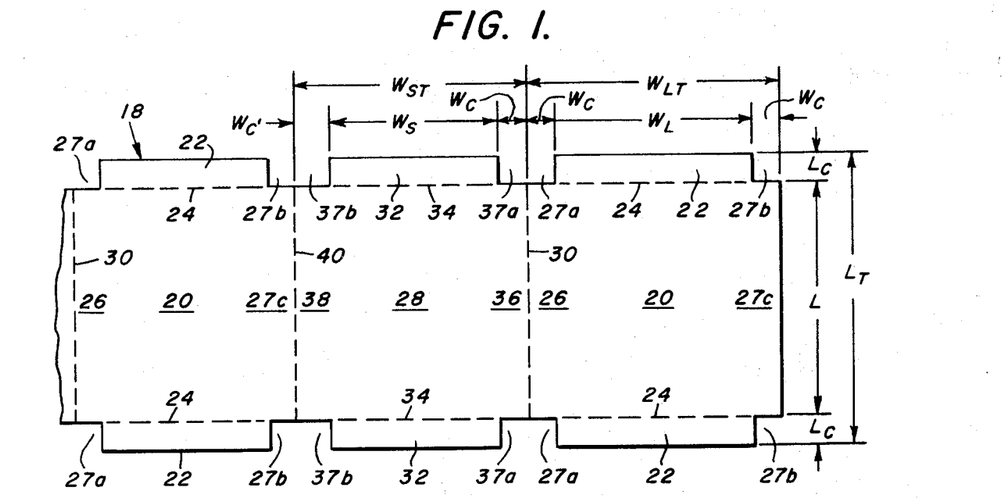
FIG. 1 is a fragmentary plan view of a cut core strip blank for the first core strip utilized in the fabrication of the core member and showing alternate first bonding sections provided with first bonding flanges projecting from each end of each first bonding section, an adjacent first connecting section having a first connecting flange and the cut out portions of each of these members wherein the bonding sections are longer than the connecting sections.

With specific reference to the form of this invention illustrated in the drawings, and referring particularly to FIG. 1, a continuous core strip blank utilized to form either a first core strip 10 (FIGS. 2–5) or a second core strip 12 (FIGS. 3–5) or a third core strip 14 (FIG. 3) for a core member 16 (FIGS. 3,5) (in this case, the first core strip 10) is indicated generally by the reference numeral 18.

FIRST CORE STRIP SHEET 18

The first core strip blank 18 (FIG. 1) is a stamped extruded or sheared metal blank having a thickness of about 0.001 inch to about 0.125 inch and has a first bonding section 20 (FIGS. 1–5) (for use as a major axis element). The section 20 is provided with first bonding flanges 22 (FIGS. 1–5) which flanges 22 are separated from the first bonding section 20 by score or bend lines 24 (FIG. 1) and project from the top and bottom (as viewed in FIG. 1) of the first bonding section 20. The flanges 22 are formed by cutouts 27a (FIGS. 1,2) along a first bonding portion 26 (FIGS. 1,4) on the left-hand side (FIG. 1) of the first bonding section 20 (FIG. 1) and a cutout 27b (FIGS. 1-4) provided on the other or right-hand end 27c (FIGS. 1–4) of the first bonding section 20.

Figure 2:
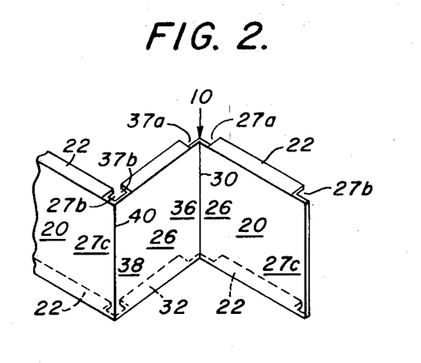
FIG. 2 is a fragmentary isometric view of first core strip formed from the core strip sheet shown in FIG. 1.

The first core strip sheet 18 has a first connecting section 28 (FIGS. 1–5) (for use as a minor axis element) adjacent the first bonding portion 26 of the first bonding section 20, which first connecting section 28 is separated from the first bonding section 20 by a score or bend line 30 (FIGS. 1,2). The first connecting section 28 (FIG. 1) is provided with first connecting flanges 32 (FIGS. 1–4) which flanges 32 are separated from the first connecting section 28 by score lines 34 (FIG. 1). The first connecting flanges 32 define with the first connecting section 28 a first connecting edge portion 36 (FIGS. 1,2,4) adjacent the first bonding portion 26 of the first bonding section 20 and are formed by cutouts 37a (FIGS. 1–4) and 37b (FIGS. 1–4). The cutouts 37b (opposite the first bonding section 20) are slightly wider than cutouts 37a on the other or right-hand end or first connecting edge portion 36, as viewed in FIG. 1, or cutouts 27a, 27b in the first bonding section 20 in order to allow for the bend angle a (FIGS. 3,4) between the second bonding section 20 and the first connecting section 28 being slightly less than 90° (i.e., about 82.9°). The right-hand end portion 27c of the next adjacent (to the left) first bonding section 20 (FIG. 1) is separated from the end portion 38 (FIGS. 1–4) of the first connecting section 28 by a score or bend line 40 (FIGS. 1,2).

Thereafter, the first core strip blank 18 is bent by hand or by machine (not shown) from the flat position shown in FIG. 1 to the bent position shown in FIG. 2 to form a first core strip 10.

Figure 4:
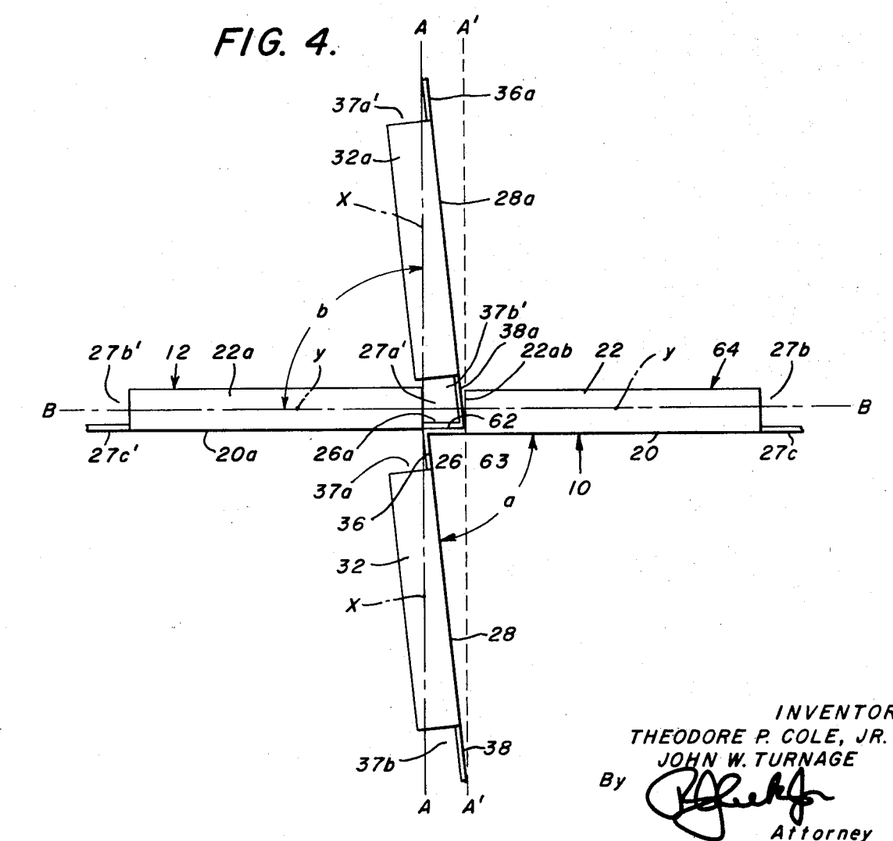
FIG. 4 is a fragmentary view similar to FIG. 3 showing in detail the connection between a first core strip and a second core strip of the core member of this invention.
Figure 5:
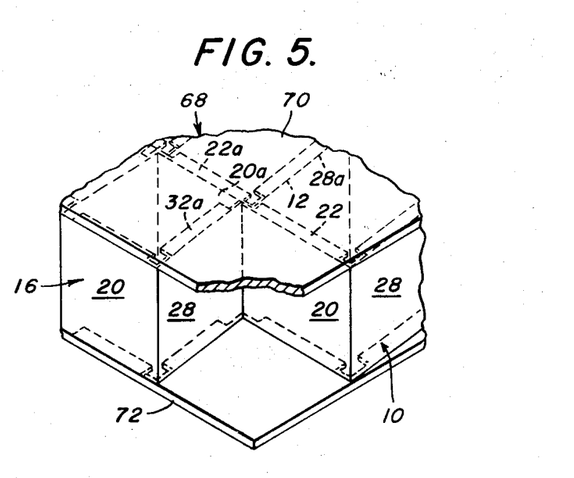
FIG. 5 is a fragmentary isometric view of a portion of the high-strength, light-weight panel and showing a first cover member and a second cover member secured to opposite sides of a portion of the core member.

As shown in FIG. 4, the first connecting section 28 projects from the terminal of the first bonding section 20, (i.e., the first bonding portion 26 of the first bonding section 20) at the bend angle a (which, for example, may be about 82.9°) so that the other end 38 of the first connecting section 28 lies adjacent a plane A'—A' (FIG. 4) disposed at an axis angle b (FIG. 4) in this case normal to the inner end 22ab (FIG. 4) of the first bonding portion 26 thereby providing a finished edge A'—A' (FIG. 4) to the panel 68 (FIG. 5).

Figure 3:
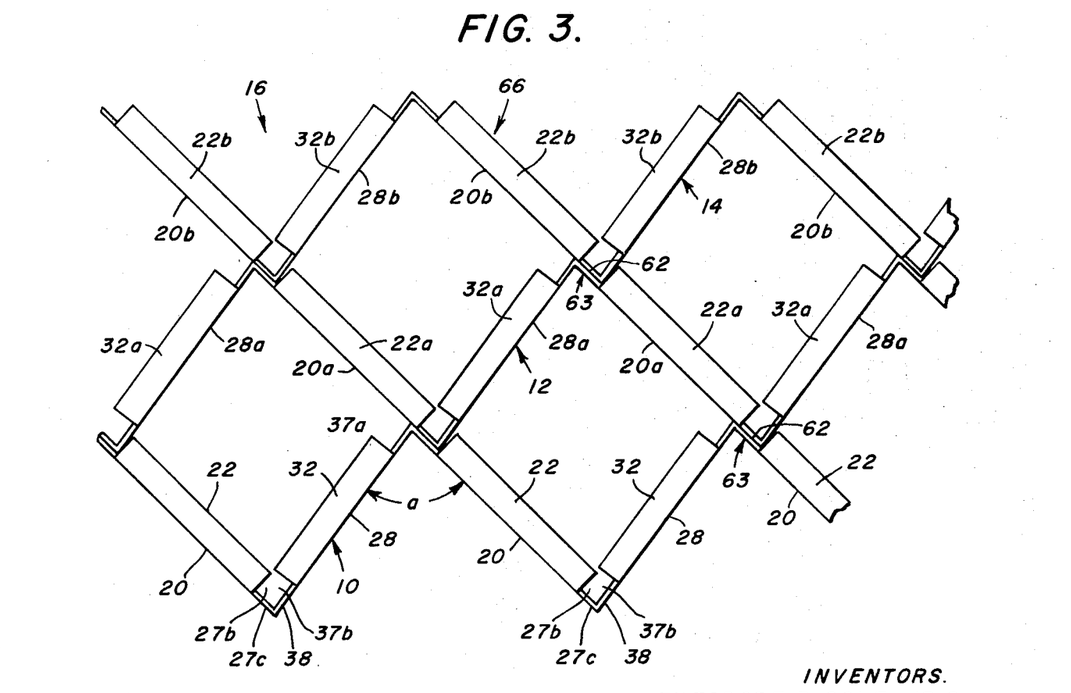
FIG. 3 is a fragmentary plan view showing the assembly of portions of three core strips into a portion of the core member.

Referring now to FIGS. 3,4 and in particular to FIG. 4, the core member 16 also has the second core strip 12 disposed adjacent the first bonding portion 26 of the first core strip 10.

SECOND CORE STRIP 12

The second core strip 12 (FIGS. 3,4) has a second connecting section 28a (FIGS. 3–5) provided with a second connecting flange 32a projecting from each end of the second connecting section 28a. The second connecting flange 32a defines with the second connecting section 28a a second connecting edge portion 38a (FIG. 4) on one end (i.e., the lower end as viewed in FIGS. 3,4) of the second connecting section 28a adjacent the first bonding portion 26 of the first bonding section 20 and is formed by a cutout 37b' (FIG. 4) in the second connecting flange 32a. The other end portion 36a (FIG. 4) of the second connecting section 28a is formed by a cutout 37a' (FIG. 4) in the second connecting flange 32a. The second connecting section 28a (FIG. 4) extends from the first bonding portion 26 of the first bonding section 20 substantially parallel to the first connecting section 28 so that the centers X (FIG. 4) of the connecting sections 28,28a lie on a minor axis of strength A—A (FIG. 4). The second core strip 12 also has a second bonding section 20a (FIGS. 3,4,5) extending from the second connecting edge portion 38a substantially as a continuation of the first bonding section 20 of the first core strip 10. The centers y (FIG. 4) of the bonding sections 20a,20 lie parallel to a major axis of strength B—B (FIG. 4), which axis B—B is disposed at angle b (FIG. 4) equal to about 90° with the minor axis of strength A—A (FIG. 4). The second bonding section 20a is provided with a second bonding flange 22a (FIGS. 3–5) projecting from each end of the second bonding section 20a. Each second bonding flange 22a defines with the second bonding section 20a and the second connecting edge portion 38a a second bonding portion 26a disposed in sealing engagement with the first bonding portion 26 of the first bonding section 20. The second bonding flange 22a has cutouts 27a' (FIG. 4) adjacent the second bonding portion 28a and cutouts 27b' (FIG. 4) adjacent end portion 27c' of the second bonding section 20a.

A first connection means such as, for example, a type EC1838 adhesive 62 (FIGS. 3,4) is associated with the second bonding portion 26a of the second bonding section 20a and the first bonding portion 26 of the first bonding section 20 to secure them together, as shown in FIG. 4, to form the lapped joint 63 (FIGS. 3,4) thereby forming adjacent half portions 64 (FIG. 4) of two adjacent substantially rhombic cells 66 (FIG. 3) of the core member 16. Type EC1838 adhesive is the trade name for an adhesive manufactured by Minnesota Mining and Manufacturing Co., St. Paul, Minnesota.

In order to form a rhombic cell 66 having, for example, about 2 inch sides, the dimensions shown in FIG. 1 may have the following approximate values:

TABLE IA

| Dimension | Value inches |
|---|---|
| L | 2 |
| $L_T$ | 2½ |
| $L_C$ | ¼ |
| $W_L$ | 1¾ |
| $W_{LT}$ | 2¼ |
| $W_C$ | ¼ |
| $W_S$ | 1½ |
| $W_{ST}$ | 2 1/16 |
| $W_{C'}$ | 5/16 |

The completed core member 16 is then fabricated into a high-strength, light-weight panel 68 as shown in FIG. 5.

PANEL 68

In order to secure a first cover member 70 (FIG. 5) and a second cover member 72 (FIG. 5) on opposite sides of the core member 16, adhesive 62 is applied to the first bonding flanges 22 and first connecting flanges 32 of the first core strip 10, to the second connecting flanges 32a, and the second bonding flanges 22a of the second core strip 12, etc., and the parts are adhesively bonded together by pressure (not shown). It will be understood that the panel 68 can be fabricated with only one of the cover members 70,72.

ALTERNATIVE EMBODIMENTS

It will be understood by those skilled in the art that alternatively the following ambient temperature setting adhesives, thermally setting adhesives, contact adhesives, and thermoplastic adhesive films 62 may be employed:

| Trade Name or Trade Mark | Manufacturer |
|---|---|
| "Surlyn A" Conomer resin | E. I. du Pont de Nemours & Co. |
| "USS Nexus P0003" thermoplastic adhesive | United States Steel Corp. |
| "USS Nexus S8002" thermosetting epoxy based two-component adhesive (ambient cured) | United States Steel Corp. |
| "USS Nexus S8005" thermosetting epoxy-based two component adhesive (elevated temperature cured) | United States Steel Corp. |
| "USS Nexus P1003" adhesive film | United States Steel Corp. |
| "USS Nexus P1006" adhesive film | United States Steel Corp. |
| EC2086 thermosetting adhesive | Minnesota Mining & Manufacturing Company |
| Type EC2214 heat curing adhesive | Minnesota Mining & Manufacturing Company |
| Type EC 2086 thermosetting adhesive | Minnesota Mining & Manufacturing Company |
| Type XA3428 deaerated glass bead adhesive | Minnesota Mining & Manufacturing Company |
| Type EC2328 deaerated glass bead adhesive | Minnesota Mining & Manufacturing Company |
| Rubber Cement No. 494 | Sanford Ink Co. |
| MARBOND 200 curable neoprene based contact adhesive | Marbon Division Borg Warner Corp. |

In addition, the first core strip 10, second core strip 12, third core strip 14, etc. may be lapped together at 63 (FIG. 3) and the first cover member 70 and second cover member 72 secured to the first bonding flanges 22 and first connecting flanges 32 of the first core strip 10, and to the second connecting flanges 32a and the second bonding flanges 22a of the second core strip 12, etc. as by welding, soldering, brazing, riveting, crimping or the like.

Further the material for the core member 16 may be any sheet material having sufficient rigidity such as paper, impregnated paper, laminated materials formed of laminated paper, wood, metals, and combinations thereof or plastics such as nylon, teflon, polyvinyl chloride, polyvinyl acetate, polyolefins, or the like.

Figures 6, 7:
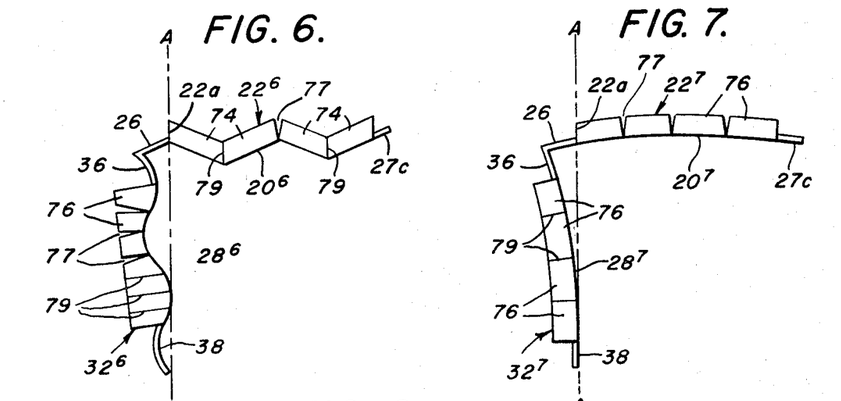
FIG. 6 is a view similar to FIG. 4 of an alternative embodiment of the first core strip and showing a serrated first long section provided with a first long flange composed of a plurality of tabs and a corrugated first short section also provided with a first short flange having a plurality of tabs.
FIG. 7 is a view similar to FIG. 6 of a further alternative embodiment wherein the first long section and the first long flanges are concave arcuate and wherein the first short section and first short flange are convex arcuate.

Alternatively, in FIG. 6, the first bonding section $20^6$ is serrated at 20' and is provided with a first bonding flange $22^6$ having a plurality of tabs 74. The corrugated (at 28') first connecting section $28^6$ also is provided with a first connecting flange $32^6$ having a plurality of tabs 76. To form the tabs 76, slits are cut in the flanges $22^6$, $32^6$ to form V-slots 77 on bending and V-slots are cut in the flanges $22^6$, $32^6$ to form slits 79 on bending.

In FIG. 7, the first bonding section $20^7$ is concave arcuate and is provided with a concave arcuate first bonding flange $22^7$ having tabs 76. The first connecting section $28^7$ and the first connecting flange $32^7$ having tabs 76 shown in FIG. 7, are convex arcuate.

Figure 8:
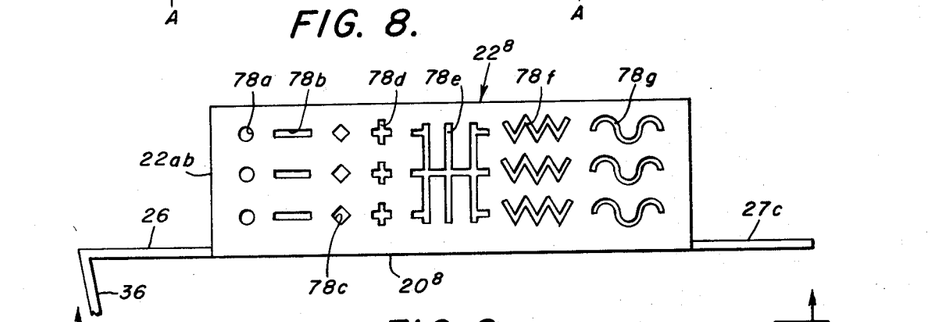

FIG. 8 shows various types of dimples or holes provided in the first bonding flange $22^8$. In FIG. 8 are shown round holes 78a, slots 78b, square or rhombic holes 78c, cross holes 78d, mesh holes 78e, zig-zag holes 78f, corrugated holes 78g, etc. utilized for increasing the bondability between either the first cover member 78 or the second cover member 72, the adhesive 62 and the first bonding flange $22^8$.

Figure 9:
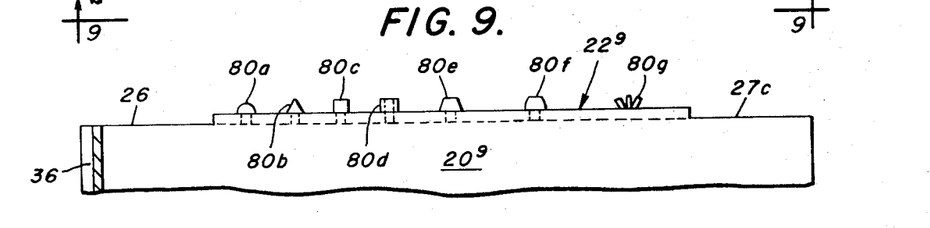

Alternatively, the first bonding flange $22^9$ (FIG. 9) may be provided with protuberances, such as the round dimples 80a, the pointed dimples 80b, the rectangular dimples 80c, the hollow dimples 80d, the frusto-conical hollow dimples 80e, the frusto-spherical hollow dimples 80f, the divergent prong-type dimples 80g, and the like to provide controlled bond line thickness and increased shear strength.

Figure 10:
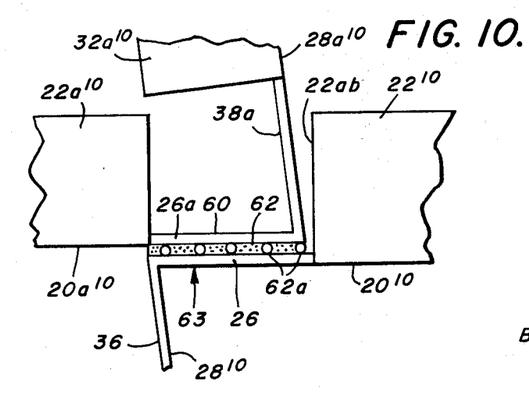
FIG. 10 is a fragmentary plan view of an alternative embodiment of the lapped joint between the first bonding portion and the second bonding portion and showing the use of spherical glass beads, sand, or the like in the adhesive bonding agent to properly space the first bonding portion from the second bonding portion and to prevent emission of the adhesive from between the lapped joint.

In order to prevent the squeezing out of the adhesive 62 from between the first bonding portion 26 (FIG. 10) and the second bonding portion 26a, generally spherical mini-particles 62a, such as glass beads, sand, silicon, quartz, or the like may be mixed with the adhesive 62 and disposed between the first bonding portion 26 and the second bonding portion 26a, as shown in FIG. 10.

Figure 11:
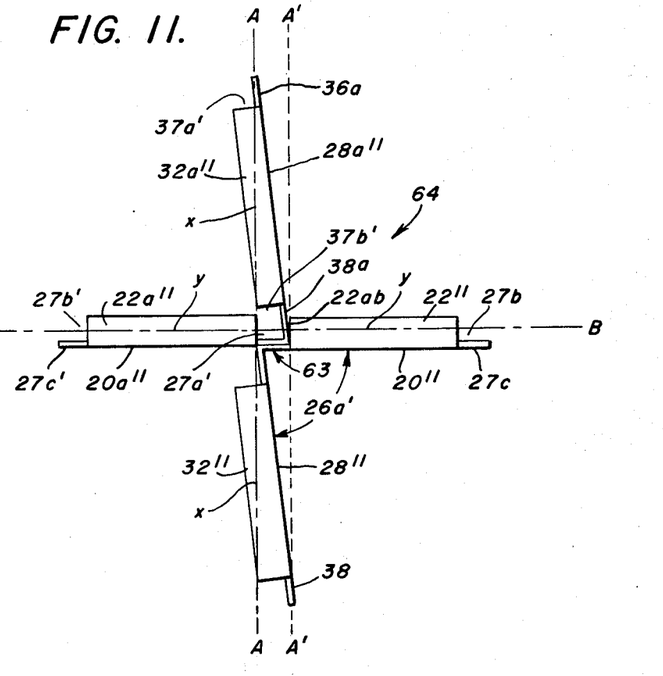
FIGS. 11,12 are views similar to FIG. 4 wherein the bonding sections are shorter than the connecting sections and the bonding sections are equal to the connecting sections respectively.
Figure 12:
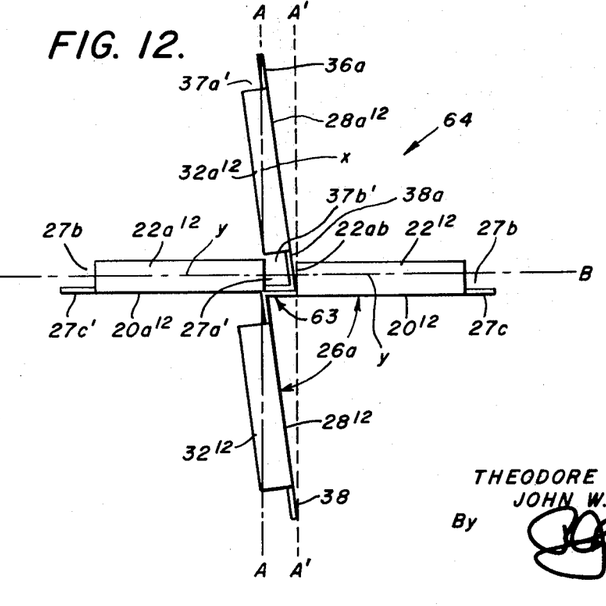

In FIG. 11, the bonding sections $20^{11}$, $20a^{11}$ are shorter than the connecting sections $28^{11}$, $28a^{11}$. FIG. 12 shows bonding sections $20^{12}$, $20a^{12}$ about equal to the connecting sections $28^{12}$, $28a^{12}$.

Figure 13A:
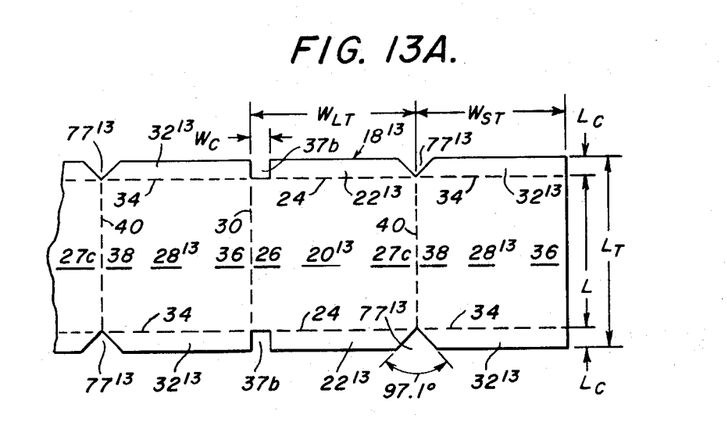
FIG. 13A is a view similar to FIG. 1 of an alternative embodiment showing a rhombic type blank wherein the major axis element is separated on one side from the minor axis element by a V slot contained in both elements and on the other side of the major axis element by a cutout in the major axis element flange and also showing substantially full length flanges on both the major axis element and the minor axis element.

In FIG. 13A, the rhombic type blank $18^{13}$ has a major axis element or first bonding section $20^{13}$ provided with first bonding flanges $22^{13}$. Each of the first bonding flanges $22^{13}$ is provided at the left-hand end (FIG. 13A) with cutouts 37b and at the other, or right-hand end (FIG. 13A) with one-half of a V-slot $77^{13}$. The minor axis element or first connecting section $28^{13}$ has first connecting flanges $32^{13}$, each provided on the left-hand end thereof, as viewed in FIG. 13A, with the other half of the V-slot $77^{13}$ registering and cooperating with the half of the V-slot $77^{13}$ in the first bonding flanges $22^{13}$. The V-slot $77^{13}$ forms an angle of about 97.1° as shown in FIG. 13A.

Figure 13B:
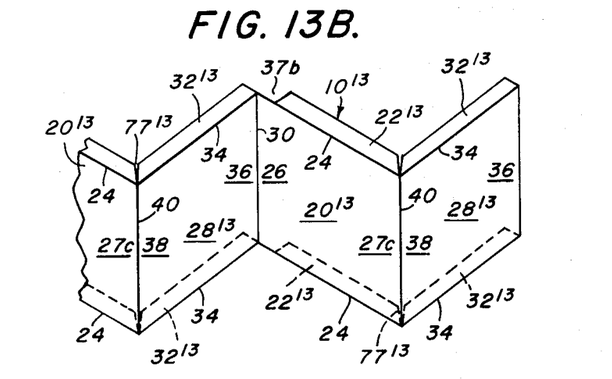
FIG. 13B is a view similar to FIG. 2 showing the blank of FIG. 13A in the bent form.
Figure 13C:
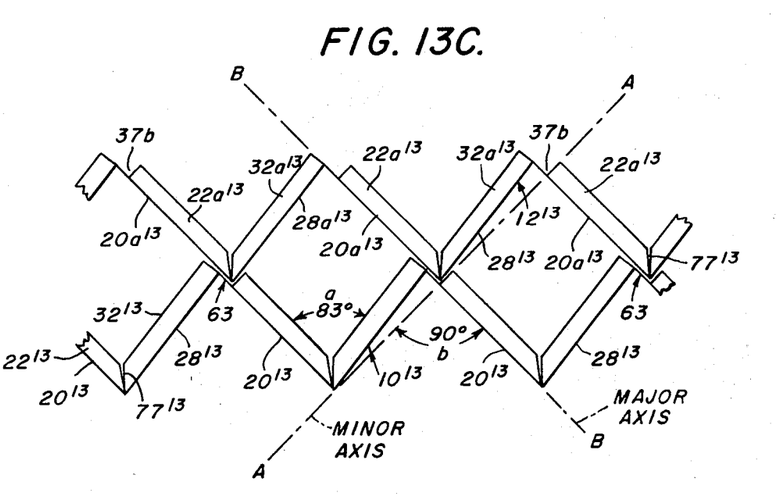
FIG. 13C is a view similar to FIG. 3 showing the assembly of two bent blanks (shown in FIG. 13B) at the lapped joints to form the core of a panel and wherein the bend angle is about 83° and the axis angle is about 90°.

The blank $18^{13}$ is then bent into the form of a first core strip $10^{13}$ shown in FIG. 13B. Thereafter, the first core strip $10^{13}$ (FIG. 13C) and a second core strip $12^{13}$ (FIG. 13C) are assembled at the lapped joints 63, as hereinbefore explained, so that the bend angle a (FIG. 13C) is about 83° and the axis angle b (FIG. 13C) is about 90°.

In order to form a rhombic cell having, for example, 2 inch sides, the dimensions shown in FIG. 13A may have the following approximate values:

TABLE IB

| Dimension | Value in inches |
|---|---|
| L | 2 |
| $L_T$ | 2½ |
| $L_C$ | ¼ |
| $W_L$ |  |
| $W_{LT}$ | 2¼ |
| $W_C$ | ¼ |
| $W_S$ |  |
| $W_{ST}$ | 2 1/16 |

Figure 14A:
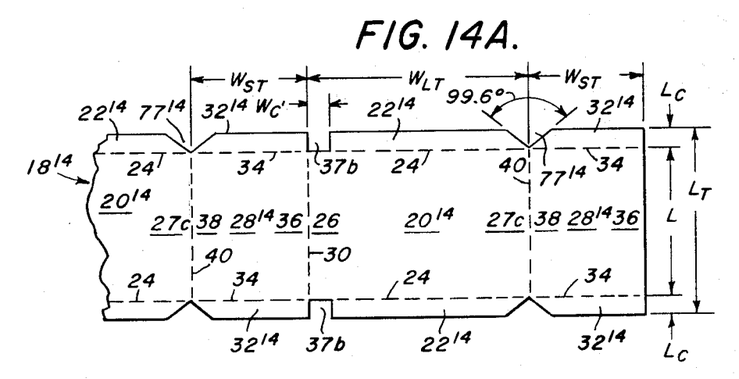
FIG. 14A is a view similar to FIG. 13A of another embodiment showing a parallelogram-type blank having a long major axis element and a shorter minor axis element, which major axis element is separated from the minor axis element on one side by a V-slot partially contained in both elements and separated on the other side of the major axis element from the minor axis element by a cutout contained in the major axis element.
Figure 14B:
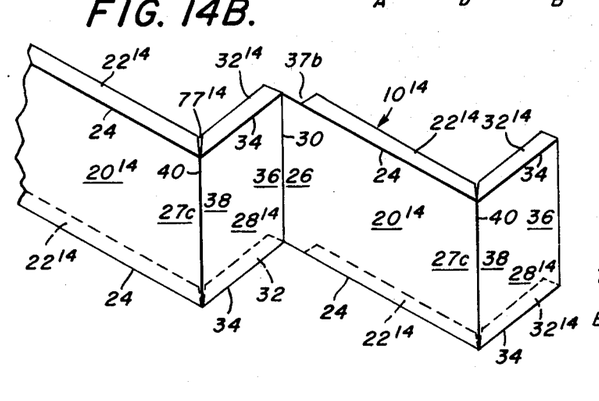
FIG. 14B is a view similar to FIG. 13B showing the bent form of the blank shown in FIG. 14A.
Figure 14C:
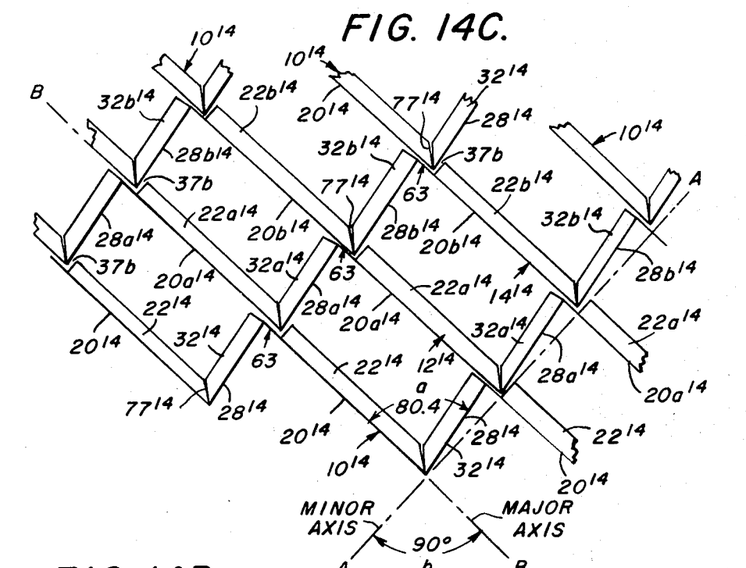
FIG. 14C is a view similar to FIG. 13C showing a plurality of bent blanks (shown in FIG. 14B) joined together in a plurality of lapped joints to form the core for a panel and wherein the bend angle is about 80.4° and the axis angle is about 90°.

Referring now to FIGS. 14A–14C, a rectangular type blank $18^{14}$ is shown. Such blank $18^{14}$ (FIG. 14A) has a long major axis element or first bonding section $20^{14}$ and a shorter minor axis element or first connecting section $28^{14}$. The first bonding section $20^{14}$ is separated from the first connecting section $28^{14}$ on the right-hand side (FIG. 14A) by a V-slot $77^{14}$ partially contained in each of the first bonding flange $22^{14}$ and the first connecting flange $32^{14}$. On the left-hand side (FIG. 14A) of the first bonding flange $22^{14}$ cutouts 37b contained in the first bonding section $20^{14}$ separate the first bonding flange $22^{14}$ from the first connecting flange $32^{14}$.

The blank $18^{14}$ is then bent into the first core strip $10^{14}$ shown in FIG. 14B. The first core strip $10^{14}$ is assembled to a second core strip $12^{14}$ at the bonded lapped joints 63 as shown in FIG. 14C to provide a bend angle of about 80.4° and an axis angle of about 90°.

In order to form a substantially rectangular cell 66 having, for example, about 2″ × 3″ sides, the dimensions shown in FIG. 14A may have the following approximate values:

TABLE II

| Dimension | Value in inches |
|---|---|
| L | 2 |
| $L_T$ | 2½ |
| $L_C$ | ¼ |
| $W_{LT}$ | 3 |
| $W_{C'}$ | 5/16 |
| $W_{ST}$ | 1 9/16 |

Figure 15A:
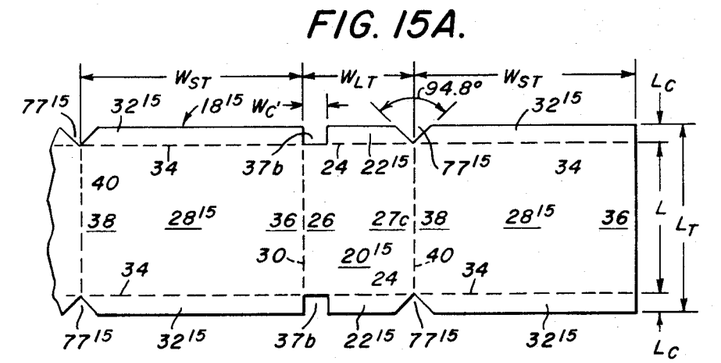
FIG. 15A is a view similar to FIGS. 13A,14A of a parallelogram-type blank having a long minor axis element and a shorter major axis element, which major axis element is separated from the minor axis element on one side of the major axis element by a V slot and separated on the other side of the major axis element from the minor axis element by a cutout contained within the major axis element.
Figure 15B:
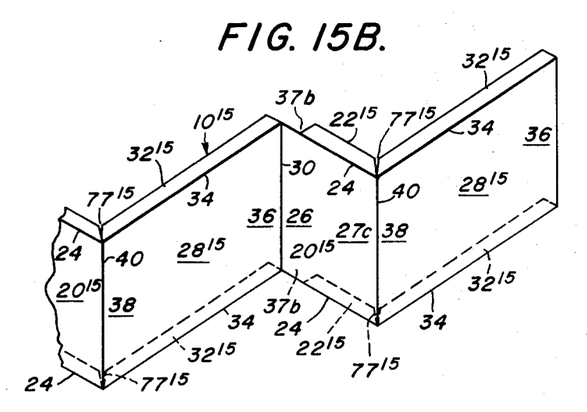
FIG. 15B is a view similar to FIGS. 13B,14B and showing the bent formed blank of FIG. 15A.
Figure 15C:
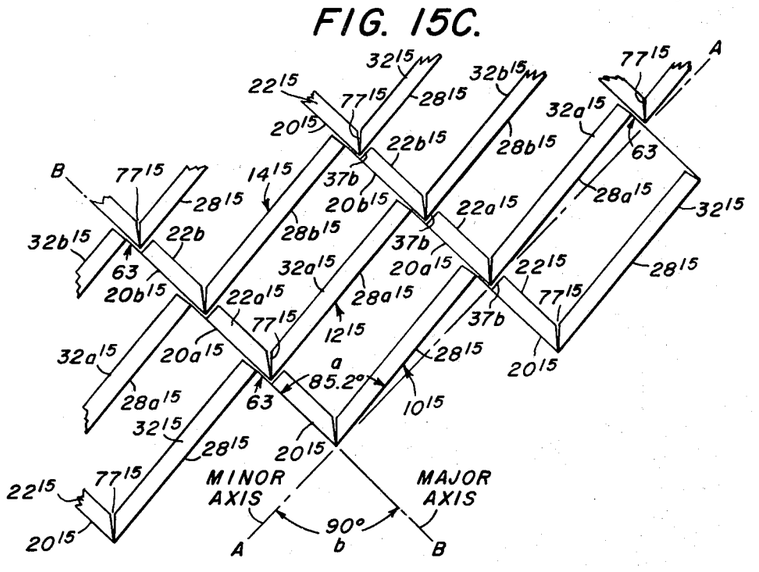
FIG. 15C is a view similar to FIGS. 13C,14C of a plurality of bent blanks of FIG. 15B bonded together at the lapped joints to form a core for a panel and wherein the bend angle is about 85.2° and the axis angle is about 90°.

In FIGS. 15A–15C, a rectangular type blank $18^{15}$ is shown. The $W_{C'}$ dimension is determined by the desired dimension of the lapped joint 63, and the thickness or gauge of the metal in the first core strip 10, etc. This blank $18^{15}$ has a long minor axis element or first connecting section $28^{15}$ and a shorter major axis or first bonding section $20^{15}$. Each first bonding flange $22^{15}$ is separated from the associated first connecting flange $32^{15}$ on the right-hand side (FIG. 15A) by a V-slot $77^{15}$ and is separated on the other or left-hand side (FIG. 15A) from the adjacent first connecting flange $32^{15}$ by cutouts 37b contained within the first bonding section $20^{15}$. The left-hand portions of the first connecting flanges $32^{15}$ (FIG. 15A) are provided with registering and cooperating V-slots $77^{15}$. The V-slots $77^{15}$ in the first bonding flanges $22^{15}$ and the first connecting flanges $32^{15}$ are disposed at an angle of about 94.8°. Thereafter, the blank $18^{15}$ is bent into the first core strip $10^{15}$ shown in FIG. 15B. This first core strip $10^{15}$ and a second core strip $12^{15}$ are then bonded together, as hereinbefore explained, at the lapped joints 63 (FIG. 15C) to provide a bend angle of about 85.2° and an axis angle of about 90°.

In order to form a substantially rectangular type cell for a long minor axis element $28^{15}$, the dimensions shown in FIG. 15A may have the following approximate values:

TABLE III

| Dimension | Value in inches |
|---|---|
| L | 2 |
| $L_T$ | 2½ |
| $L_C$ | ¼ |
| $W_{LT}$ | 1½ |
| $W_{C'}$ | 5/16 |
| $W_{ST}$ | 3 1/32 |

Figure 16A:
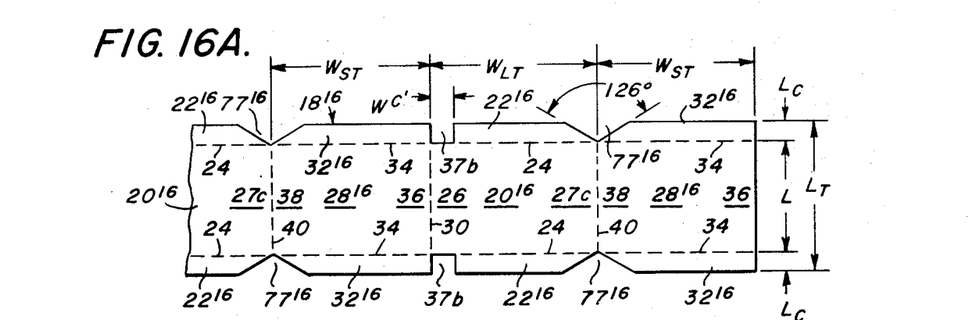
FIG. 16A is a view similar to FIGS. 13A–15A of a rhombic type blank wherein the major axis element is separated from the minor axis element on one side by a V slot contained in both elements and on the other side by a cutout contained in the major axis element.

The blank $18^{16}$ shown in FIG. 16A is of the rhombic type. The major axis element or first bonding section $20^{16}$ is separated from the minor axis element or first connecting section $28^{16}$ on one side (in this case, the right side, FIG. 16A) by V-slots $77^{16}$, each contained in adjacent flanges $22^{16}$, $32^{16}$, and on the other side by cutouts 37b contained in the first bonding flanges $22^{16}$ adjacent the first connecting flanges $32^{16}$. In FIG. 16A, the V-slots $77^{16}$ form an angle of about 126°.

Figure 16B:
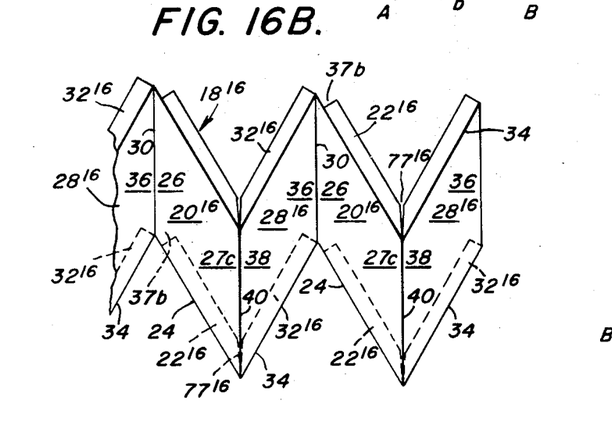
FIG. 16B is a view similar to FIGS. 13B–15B of the formed bent blank of FIG. 16A.

The blank $18^{16}$ is then bent into the form $10^{16}$ shown in FIG. 16B. Thereafter, the first core strip $10^{16}$ and a second core strip $12^{16}$ are bonded together at the lapped joints 63 to form a core $16^{16}$ shown in FIG. 16C. Such core $16^{16}$ has a bend angle of about 54° and an axis angle of about 60°.

Figure 16C:
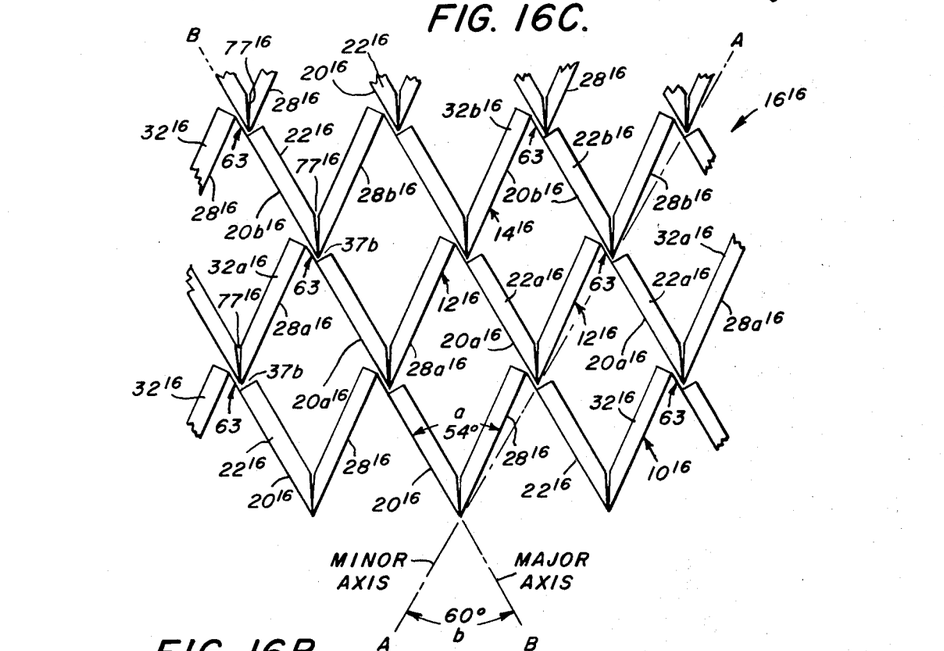
FIG. 16C is a view similar to FIGS. 14C–15C of a plurality of bent blanks shown in FIG. 16B bonded together at a plurality of lapped joints to form the core of a panel and wherein the bend angle is about 54° and the axis angle is about 60°.

In order to form the rhombic cell shown in FIG. 16C having, for example, about 2 inch sides, the dimensions shown in FIG. 16A may have the following approximate value:

TABLE IV

| Dimension | Value in inches |
|---|---|
| L | 2 |
| $L_T$ | 2½ |
| $L_C$ | ¼ |
| $W_{LT}$ | 2¼ |
| $W_{C'}$ | 5/16 |
| $W_{ST}$ | 2⅛ |

Figure 17A:
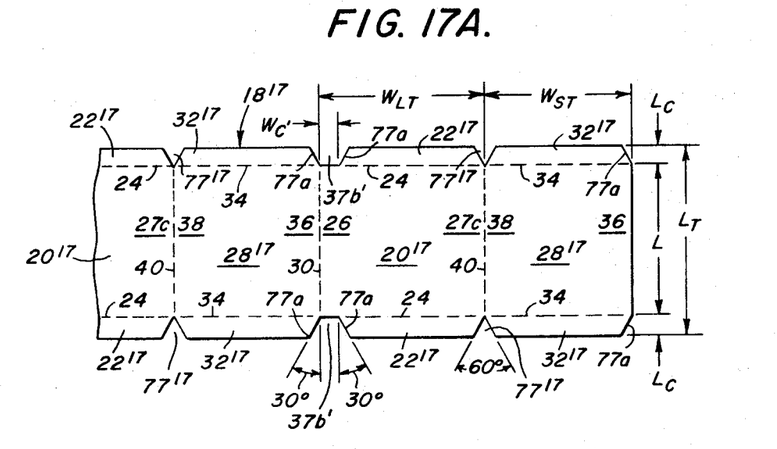
FIG. 17A is a view similar to FIGS. 13A–16A of a rhombic type blank wherein the major axis element is separated from the minor axis element on one side by a V slot contained in both elements and on the side of the major axis element by a cutout contained within the major axis element and also showing sloping sides on the cutout which sloping sides are contained in both the major axis element and the minor axis element.

The blank $18^{17}$ shown in FIG. 17A is of the rhombic type wherein the major axis element or first bonding section $20^{17}$ is separated from the minor axis element or the first connecting section $28^{17}$ on one side of the first bonding flanges $22^{17}$ (i.e., the left side, FIG. 17A) by cutouts 37b' contained within the first bonding flanges $22^{17}$. The cutouts 37b' are provided with sloping sides 77a in the first bonding flanges $22^{17}$ and in the first connecting flanges $32^{17}$. As in the prior embodiments, V-slots, $77^{17}$ are provided in the adjacent portions of the first bonding flanges $22^{17}$ and the first connecting flanges $32^{17}$. These V-slots $77^{17}$ form an angle of about 60°. As shown in FIG. 17A, the tapered sides 77a of the slots 37b' are disposed at an angle of about 30° with the vertical axis of the strip 18$^{17}$.

Figure 17B:
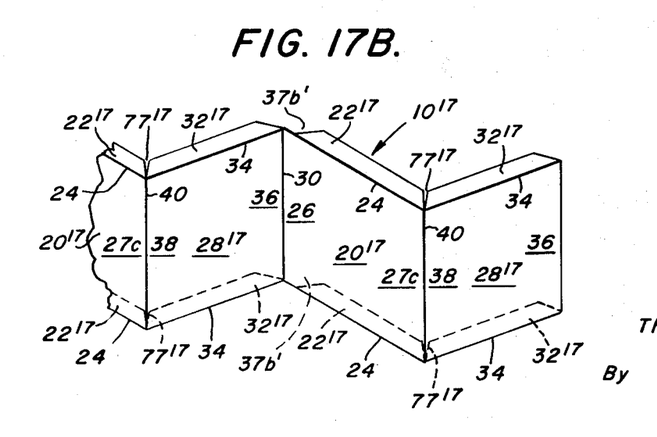
FIG. 17B is a view similar to FIGS. 13B–16B showing the bent blank of FIG. 17A.
Figure 17C:
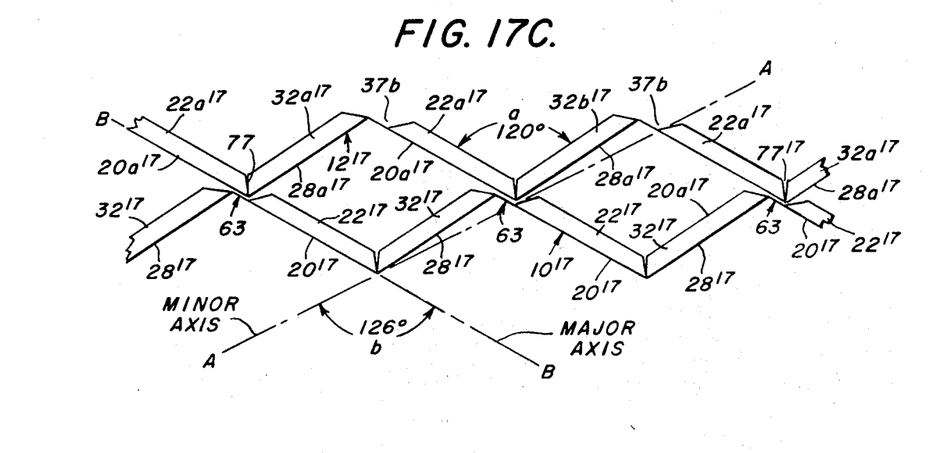
FIG. 17C is a view similar to FIGS. 13C–16C showing a plurality of the bent blanks of FIG. 17B bonded together at the lapped joints to form the core of a panel and wherein the bend angle is about 120° and the axis angle is about 126°.

The blank 18$^{17}$ (FIG. 17A) is then formed into the first core strip 10$^{17}$ as shown in FIG. 17B. The first core strip 10$^{17}$ is then bonded to a second core strip 12$^{17}$ at the lapped joints 63, as shown in FIG. 17C to provide a bend angle at about 120° and an axis angle of about 126°.

To form a rhombic cell having, for example, about 2 inch sides, the dimensions shown in FIG. 17A may have the following approximate values:

TABLE V

| Dimension | Value in inches |
|---|---|
| L | 2 |
| $L_T$ | 2½ |
| $L_C$ | ¼ |
| $W_{LT}$ | 2¼ |
| $W_{C'}$ | ¼ |
| $W_{ST}$ | 2 |

Figure 18A:
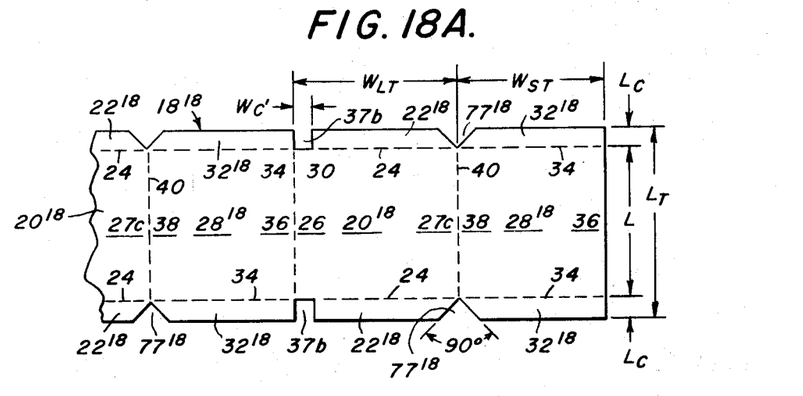
FIG. 18A is a view similar to FIGS. 13A–17A of a square type blank wherein the major axis element is separated on one side from the minor axis element by a V slot and on the other side of the major axis element by a cutout contained within the major axis element.

Referring now to the square type blank 18$^{18}$ shown in FIG. 18A, the major axis element or first bonding section 20$^{18}$ is separated on the right-hand portion (FIG. 18A) of the first bonding flanges 22$^{18}$ from the first connecting flanges 32$^{18}$ of the minor axis element or first connecting section 28$^{18}$ by V-slots 77$^{18}$. These V-slots 77$^{18}$ form an angle of about 90°. The left-hand sides (FIG. 18A) of the first bonding flanges 22$^{18}$ are provided with cutouts 37b, which cutouts 37b separate the first bonding flanges 22$^{18}$ from the adjacent first connecting flanges 32$^{18}$.

Figure 18B:
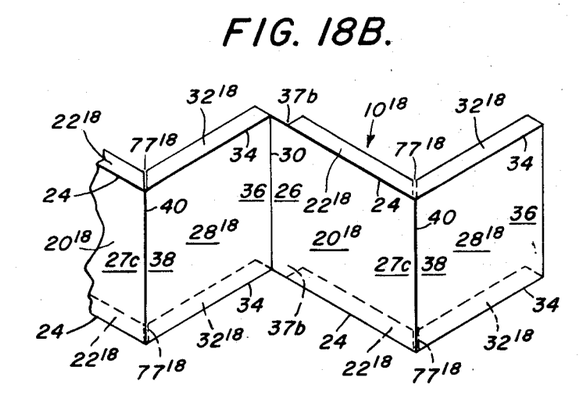
FIG. 18B is a view similar to FIGS. 13B–17B showing the bent form of the blank shown in FIG. 18A.
Figure 18C:
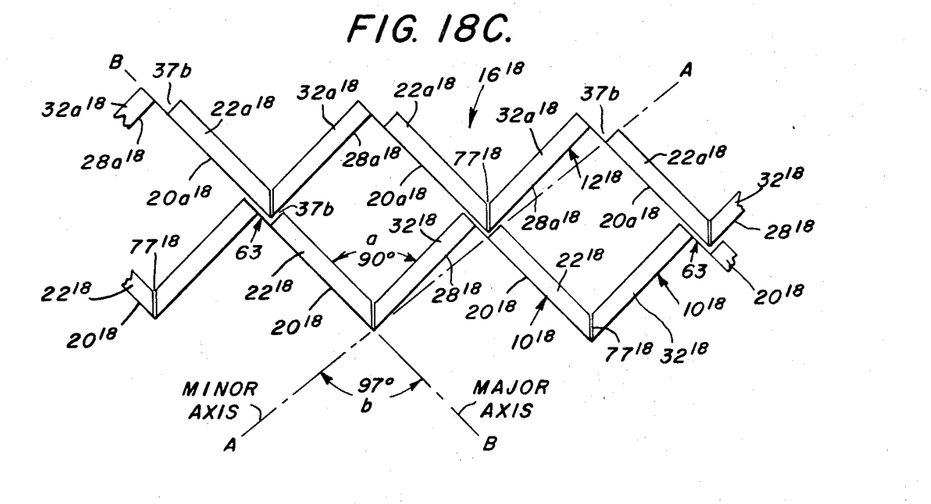
FIG. 18C is a view similar to FIGS. 13C–17C showing a plurality of the formed blanks of FIG. 18B bonded together at lapped joints to form the core of a panel and wherein the bend angle is about 90° and the axis angle is about 97°.

The formed blank 18$^{18}$ is then bent as shown in FIG. 18B to form, for example, a first core strip 10$^{18}$. This first core strip 10$^{18}$ is then joined at the lapped joints 63 to a second core strip 12$^{18}$, as explained above, to form the square type cell 16$^{18}$ having a bend angle of about 90° and an axis angle of about 97°.

In order to form a square cell having, for example, about 2 inch sides, the dimensions shown in FIG. 18A may have the following approximate values:

TABLE VI

| Dimension | Value in inches |
|---|---|
| L | 2 |
| $L_T$ | 2½ |
| $L_C$ | ¼ |
| $W_{LT}$ | 2¼ |
| $W_{C'}$ | ¼ |
| $W_{ST}$ | 2 |

SUMMARY

From the above description of the embodiments of the core member shown in FIGS. 1–5, FIGS. 13A–13C, FIGS. 14A–14C, FIGS. 15A–15C, FIGS. 16A–16C, FIGS. 17A–17C, and FIGS. 18A–18C, it will be appreciated that these embodiments may be summarized in Table VII as follows:

TABLE VII

| Fig. No. | a[1] | b[2] | Type | Slot angle C |
|---|---|---|---|---|
| 1–5 | 82.9° | 90° | (1) Rhombic; (2) Major axis element 20 wider than minor axis element 28; (3) Major axis element flanges 22 have cutouts 27a, 27b; (4) Minor element flanges 32 have cutouts 37a, 37b; and (5) $W_{C'} - W_C = 1/16''$. | |
| 13A–13C | 82.9° | 90° | (1) Rhombic; (2) Major axis element 20$^{13}$ is wider than minor axis element 28$^{13}$; (3) Major axis element flange 22$^{13}$ has V-slot 77$^{13}$ at 97.1°/2 and cutout 36b; and (4) Minor axis flange 32$^{13}$ has V-slot 77$^{13}$ at 97.1°/2. | 97.1 |
| 14A–14C | 80.4° | 90° | (1) Rectangular; (2) Major axis element 20$^{14}$ is wider than minor axis element 28$^{14}$; (3) Major axis element flange 22 has V-slot 77$^{14}$ at 99.6°/2 and cutout 37b; (4) $W_{C'} - W_C = 1/16$; and (5) Minor axis element flange 32$^{14}$ has V-slot 77$^{14}$ at 99.6°/2. | 99.6° |
| 15A–15C | 85.2° | 90° | (1) Rectangular; (2) Minor axis element 28$^{15}$ is wider than major axis element 20$^{15}$; (3) Major axis element flange 22$^{15}$ has V-slot 77$^{15}$ at 94.8°/2 and cutout 37b; (4) $W_{C'} - W_C = 1/16''$; and (5) Minor axis element flange 32$^{15}$ has V-slot 77$^{15}$ at 94.8°/2 | 94.8° |
| 16A–16C | 54° | 60° | (1) Rhombic; (2) Major axis element 20$^{16}$ is wider than minor axis element 28$^{16}$; (3) Major axis element flange 22$^{16}$ has V-slot 77$^{16}$ at 126°/2 and cutout 37b; (4) $W_{C'} - W_C = 1/16''$; and (5) Minor axis element flange 32$^{16}$ has V-slot 77$^{16}$ at 126°/2. | 126° |
| 17A–17C | 120° | 126° | (1) Rhombic; (2) Major axis element 20$^{17}$ is wider than minor axis element 28$^{17}$; (3) Major axis element flange 22$^{17}$ has V-slot 77$^{17}$ at 60°/2 and cutout 37b having tapered side at 30°; and (4) Minor axis element flange 32$^{17}$ has V-slot 77$^{17}$ at 60°/2 and tapered side at 30°. | 60° |
| 18A–18C | 90° | | (1) Square; (2) Major axis element 20$^{18}$ is wider than minor axis element 20$^{18}$; (3) Major axis element flanges 22$^{18}$ has V-slot 77$^{18}$ at 90°/2 and cutout 37b; and (4) Minor axis element flange 32$^{18}$ has V-slot 77$^{18}$ at 90°/2. | 90° |

[1] Bend angle between major axis element and minor axis element.
[2] Axis angle between major axis and minor axis.

Figure 19:
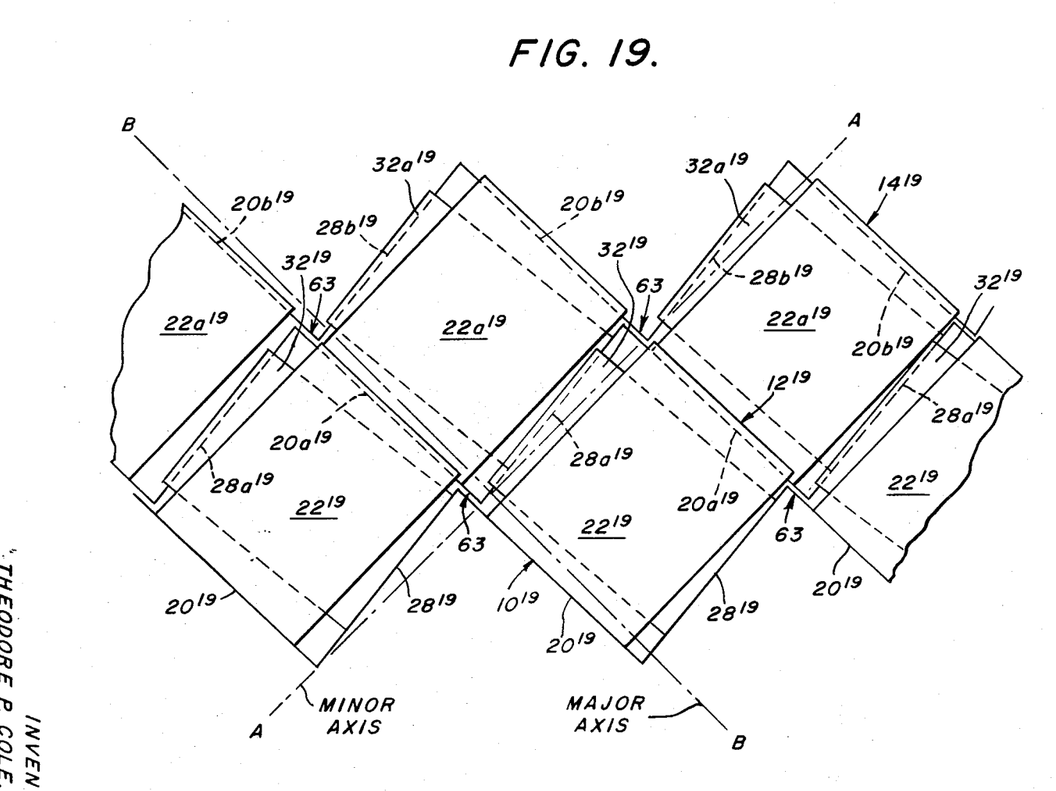
FIG. 19 is a view similar to FIG. 18C showing bonding flanges and connecting flanges in the range from about 0 inches to greater than about the dimension of the core member along either the major axis of strength or minor axis of strength.

It will be understood by those skilled in the art that the widths of the bonding flanges 20,20a,etc. and the connecting flanges 28,28a, etc. may be in the range of from about 0 inch (FIG. 19) to greater than about the longest dimension of the cell 66. In the latter case, the overlapped flanges form the cover sheet, which lapped flanges could then be covered with a decorative or other type of material, such as paint, a plastic such as vinyl sheet, wood veneer or the like. The maximum width of the bonding flanges is greater than the dimension of the cell along the minor axis of strength A—A (FIG. 19) and the maximum width of the connecting flanges is greater than the dimension of the cell along the major axis B—B (FIG. 19).

SUMMARY OF THE ACHIEVEMENTS OF THE OBJECTS OF THS INVENTION

It will be recognized by those skilled in the art that the objects of this invention have been achieved by providing an improved core member 16 (FIGS. 1–4) for a panel 68, which core member 16 provides a high strength and a light weight; provides a high strength-to-weight ratio; has continuous formed strips 10,12,14 etc. of metal or other material for the core member 16 to form parallelepiped cells 66 (FIG. 3) which cells 66 are adapted to be adhesively bonded at a lapped joint 63; provides a substantially square, high-strength core cell 66; provides a lapped joint 63 between core strips 10,12,14, etc. which lapped joints 63 have substantial contact adhesive area; is relatively simple to assemble; permits the use of a multi-nozzle adhesive apparatus on the flanges 22,32,22a,32a, of the core strips 10,12,14, etc; is readily aligned in a jig (not shown) to effect the assembly of a core member 16; utilizes as a core material any material of sufficient rigidity such as paper, impregnated paper, laminated materials, plastics such as nylon, teflon, or the like; can be assembled readily as by a thermosetting adhesive, thermoplastic adhesive, contact adhesive, welding, soldering, brazing, crimping, or the like; is formed of a core member 16 and cover sheet members 70 and 72, which members 16,70,72 can be readily varied in dimension to obtain any desired panel assembly strength; provides substantially straight core strip sections 10,12,14 etc. thereby preventing bending of the core member 16 without failure of the core material and further preventing reduction in the strength of the panel 68, prevents compressive buckling of either of the cover sheets 70,72 without causing failure of the core member 16 or the bond produced by the adhesive 62; eliminates the complex adhesive application equipment previously required for the application of an adhesive 62 to conventional panels (not shown) and provides substantially straight core elements along a major axis of strength B—B (FIGS. 3,4) and a minor axis of strength A—A (FIGS. 3,4).

While in accordance with the patent statutes, preferred and alternative embodiments of this invention have been illustrated and described in detail, it is to be particularly understood that the invention is not limited thereto or thereby.

We claim:

1. A light-weight panel for use as a temporary landing field mat, decking for trucks, tractors, rail cars, or the like, said panel having:
   a. a core member;
   b. a first cover member secured to one side of said core member;
   c. said core member having:
      (1) a first core strip,
         (a) said first core strip having a first bonding section provided with a first bonding flange projecting from one end of said first bonding section,
            (1) a first bonding portion on one side of said first bonding section,
         (b) said first core strip also having a first connecting edge portion of a first connecting section projecting from the terminal portion of said first bonding portion at a bend angle so that the opposed end portion of said first connecting section lies adjacent a plane disposed at an axis angle with the inner end of said first bonding portion,
         (c) said first connecting section being provided with a first connecting flange projecting from one end of said first connecting section,
      (2) a second core strip disposed adjacent said first bonding portion of said first core strip,
         (a) said second core strip having a second connecting section provided with a second connecting flange projecting from one end of said second connecting section,
            (1) said second connecting section having a second connecting edge portion on one side of said second connecting section adjacent said first bonding portion of said first core strip,
            (2) said second connecting section extending from said first bonding portion of said first core strip substantially parallel to said first connecting section,
      (b) said second core strip also having a second bonding section extending from said second connecting edge portion substantially as a continuation of said first bonding section of said first core strip,
         (1) said second bonding section being provided with a second bonding flange projecting from one end of said second bonding section,
            (a) a second bonding portion disposed adjacent said second connecting edge portion in sealing engagement with said first bonding portion of said first bonding section,
      (3) connection means associated with said second bonding portion of said second bonding section and said first bonding portion of said first bonding section to secure them together in a lapped joint thereby forming adjacent half portions of two adjacent substantially parallelepiped cells of said core member to align said first bonding section and said second bonding section on an axis of major strength,
      (4) said bend angle being in the range of about 54° to about 120° and said axis angle being in the range of about 60° to about 126° so that the terminal portions of said first connecting portion and said second connecting portion and said inner end of said first bonding portion are aligned substantially along a minor axis of strength at said axis angle to prevent offset of said lapped joint with a next lapped joint of one of said core strips with a third core strip, and
         (e) where said bend angle is not equal to said axis angle.

2. A core member for a high-strength, light-weight panel for use as a temporary landing field mat, decking for trucks, tractors, rail cars, or the like, said panel having a cover member secured to one side of said core member, said core member having:
   a. a first core strip;
      1. said first core strip having a first bonding section provided with a first bonding flange projecting from one end of said first bonding section,
         a. a first bonding portion on one side of said first bonding section,
      2. said first core strip also having a first connecting edge portion of a first connecting section projecting from the terminal portion of said first bonding portion at a bend angle so that the opposed end portion of said first connecting section lies adjacent a plane disposed at an axis angle with the inner end of said first bonding portion,
      3. said first connecting section being provided with a first connecting flange projecting from one end of said first connecting section,
   b. a second core strip disposed adjacent said first bonding portion of said first core strip,
      1. said second core strip having a second connecting section provided with a second connecting flange projecting from one end of said second connecting section,
         a. said second connecting section having a second connecting edge portion on one side of said second connecting section adjacent said first bonding portion of said first core strip,
         b. said second connecting section extending from said first bonding portion of said first core strip substantially parallel to said first connecting section, 2. said second core strip also having a second bonding section extending from said second connecting edge portion substantially as a continuation of said first bonding section of said first core strip,
   a. said second bonding section being provided with a second bonding flange projecting from one end of said second bonding section,
      1. a second bonding portion disposed adjacent said second connecting edge portion in sealing engagement with said first bonding portion of said first bonding section,
   c. connection means associated with said second bonding portion of said second bonding section and said first bonding portion of said first bonding section to secure them together in a lapped joint thereby forming adjacent half portions of two adjacent substantially parallelepiped cells of said core member to align said first bonding section and said second bonding section on an axis of major strength; and
   d. said bend angle being in the range of about 54° to about 120° and said axis angle being in the range of about 60° to about 126° so that the terminal portions of said end portions of said first connecting portion and said second connecting portion and said inner end of said first bonding portion are aligned substantially along a minor axis of strength at said axis angle to prevent offset of said lapped joint with a next lapped joint of one of said core strips with a third core strip; and
   e. where said bend angle is not equal to said axis angle.

3. The core member recited in claim 1 wherein either said first bonding section, said first connecting section, said second bonding section, or said second connecting section is either generally concave arcuate or generally convex arcuate.

4. The core member recited in claim 1 wherein either said first bonding flange, said first connecting flange, said second bonding flange, or said second connecting flange is provided with either a plurality of holes or a plurality of protuberances.

5. The core member recited in claim 1 wherein said connection means is either an ambient temperature setting adhesive, a thermally setting adhesive, an adhesive film, a contact adhesive, a welded joint, a soldered joint, a brazed joint, a rivet, or a crimped joint.

6. The core member recited in claim 1 wherein one core strip of said first core strip and said second core strip is formed of either paper, impregnated paper, nylon, teflon, polyvinyl chloride, polyvinyl acetate, or polyolefins.

7. The core member recited in claim 1 wherein said connecting means is an adhesive having generally spherical spacing particles mixed therein.

8. The core member recited in claim 1 wherein first bonding section is longer than said first connecting section.

9. The core member recited in claim 1 wherein said first bonding section has substantially the same width as said first connecting section.

10. The core member recited in claim 1 wherein said first bonding section has a length less than that of said first connecting section.

11. The core member recited in claim 1 wherein said first bonding flange has a width in the range of about 0 inches to greater than about the dimension of said core member along said minor axis of strength.

12. The core member recited in claim 1 wherein said first connecting flange has a width in the range of about 0 inches to greater than about the dimension of said core member along said major axis of strength.

13. The core member recited in claim 1 wherein said second bonding flange has a width in the range of about 0 inches to greater than about the dimension of said core member along said minor axis of strength.

14. The core member recited in claim 1 wherein said second connecting flange has a width in the range of about 0 inches to greater than about the dimension of said core member along said major axis of strength.

15. The core member recited in claim 1 wherein one flange of said first bonding flange, said first connecting flange, said second bonding flange, or said second connecting flange is provided with either one cutout in one end or a second cutout on the other end.

16. The core member recited in claim 15 wherein said cutout is provided with a tapered side.

17. The core member recited in claim 1 wherein said first bonding flange is provided with a first V-slot at one end.

18. The core member recited in claim 17 wherein said first connecting flange is provided with a second V-slot at one end adjacent said first V-slot.

19. The core member recited in claim 18 wherein said first V-slot and said second V-slot form a slot angle in the range of about 60° to about 126°.

* * * * *